(12) United States Patent
Gottschalk et al.

(10) Patent No.: US 10,841,178 B2
(45) Date of Patent: Nov. 17, 2020

(54) COGNITIVE BALANCING IT ECOSYSTEMS

(71) Applicant: International Business Machines Corporation, Armonk, NY (US)

(72) Inventors: Ronald G. Gottschalk, The Basin (AU); Pritpal Arora, Bangalore (IN); Dennis Anthony Perpetua, Jr., Jay, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/199,685

(22) Filed: Nov. 26, 2018

(65) Prior Publication Data

US 2020/0169477 A1 May 28, 2020

(51) Int. Cl.
| | |
|---|---|
| H04L 12/24 | (2006.01) |
| H04L 29/06 | (2006.01) |
| G06N 20/00 | (2019.01) |
| H04L 9/06 | (2006.01) |
| G06F 16/18 | (2019.01) |
| G06F 17/15 | (2006.01) |

(52) U.S. Cl.
CPC .......... *H04L 41/50* (2013.01); *G06F 16/1805* (2019.01); *G06F 17/15* (2013.01); *G06N 20/00* (2019.01); *H04L 9/0643* (2013.01); *H04L 63/1425* (2013.01); *H04L 63/20* (2013.01); *H04L 2209/38* (2013.01)

(58) Field of Classification Search
CPC ....... H04L 41/50; H04L 9/0643; H04L 63/20; H04L 63/1425; H04L 2209/38; G06N 20/00; G06F 17/15; G06F 16/1805
See application file for complete search history.

(56) References Cited

U.S. PATENT DOCUMENTS

| | | | |
|---|---|---|---|
| 2015/0294216 A1 | 10/2015 | Baughman | |
| 2017/0046792 A1* | 2/2017 | Haldenby | .......... G06Q 30/0214 |
| 2017/0180211 A1 | 6/2017 | Johnson | |
| 2018/0048528 A1 | 2/2018 | Xie | |
| 2018/0219893 A1* | 8/2018 | Li | ........ H04L 63/1441 |
| 2018/0308072 A1* | 10/2018 | Smith | ................ G06Q 20/0655 |
| 2019/0064913 A1* | 2/2019 | O'Brien | .................... G06F 1/28 |
| 2019/0066067 A1* | 2/2019 | O'Brien | ................ H04L 9/0637 |
| 2019/0079950 A1* | 3/2019 | Ramabaja | ............. H04L 9/3236 |
| 2019/0132350 A1* | 5/2019 | Smith | ................... G06F 21/577 |

FOREIGN PATENT DOCUMENTS

AU         2018100340         5/2018

OTHER PUBLICATIONS

Laherty, "Cognitive IT Infrastructure Management Services," NelsonHall, May 2018, 3 pages.

* cited by examiner

*Primary Examiner* — Azizul Choudhury
(74) *Attorney, Agent, or Firm* — Van Leeuwen & Van Leeuwen; Christopher M. Pignato (57) ABSTRACT

An approach is provided in which an information handling system loads a set of event data corresponding to an information technology (IT) ecosystem into a blockchain framework. The blockchain framework, in turn, generates a set of anomaly data based on the set of event data. The information handling system identifies a set of parameter values to adjust corresponding to the IT ecosystem based on the set of anomaly data, and the information handling system then optimizes the IT ecosystem by adjusting the identified set of parameter values in the IT ecosystem.

17 Claims, 10 Drawing Sheets

| LEVER ADJUSTMENT | PARAMETERS IMPACTED |
|---|---|
| Increase/Decrease Security Patches | • Decreased/Increased Performance |
| Decreased/Increased Performance | • Increase/Decrease Throughput<br>• Increased/Decreased Cost<br>• Increased/decreased Configuration & Tuning |
| Increase/Decrease Resilience | • Decreased/Increased Cost<br>• Increased/decreased Configuration |
| Increase/Decrease Capacity | • Decreased/Increased Cost<br>• Increased/decreased Configuration & Tuning |
| Increase/Decrease Quality | • Decreased/Increased Cost<br>• Increase/Decrease Performance<br>• Increase/Decrease SLA |
| Increase/Decrease Resource Investments | • Increase/Decrease Quality<br>• Increase/Decrease Cost<br>• Increase/Decrease in Deployment Agility |
| Increase/Decrease Process Maturity Index | • Increase/Decrease Quality |
| Increase/Decrease Automation Investment | • Increase/Decrease in Conformity to Standards<br>• Increased/Decreased Cost |
| Increase/Decrease in Deployment Agility | • Increased/Decreased Cost |

COGNITIVE BALANCING IT ECOSYSTEMS

BACKGROUND

New technologies are making business more intelligent, fast and scalable. As the world becomes more connected, organizations encounter increasingly difficulty competing as solo entities. In today's era of exponentially increasing data and information, and ubiquitous digitization, a new economic equation favors transparency and collaboration between businesses.

In search of innovation, businesses are opening up their enterprises and removing barriers to extend collaboration both inside and outside their organizations. As a result, the focus of innovation is shifting from organization-centric to one that is ecosystem-centric. An ecosystem can be thought of as a complex web of interdependent enterprises and relationships that creates and allocates business value. Ecosystems are broad by nature, potentially spanning multiple geographies and industries, including public and private institutions and consumers.

Along those lines, information technology (IT) ecosystems encompass a network of organizations that drive the creation and delivery of information technology products and services. One type of an IT ecosystem includes a product platform defined by a platform owner's core components and complemented by peripheral applications made by autonomous companies. These IT ecosystems offer solutions comprising a larger system of use than the platform owner's original platform to solve important technical problems within an industry. In successful IT ecosystems, connecting to or building upon the core solution expands the system of use and allows new and even unanticipated end uses.

Existing approaches of balancing IT ecosystems are largely driven by human endeavors that are supported by IT systems management processes, IT service management processes, spreadsheets, and staff/consultants. Challenges found with this approach include slow and cumbersome adaptation to change in the IT ecosystem when recoding/reconfiguring the existing management systems. Another challenge found is that the operational quality and success of evolving the IT ecosystem is closely aligned to the skills and experience of the staff/consultants owning/running the balancing & optimization processes. As a result, as the skilled staff/consultants move onto different jobs, the capability often moves with them. In short, the more complex an IT ecosystem, the less likely the IT ecosystem is successfully managed to achieve an optimal balance of desired business outcomes.

BRIEF SUMMARY

According to one embodiment of the present disclosure, an approach is provided in which an information handling system loads a set of event data corresponding to an information technology (IT) ecosystem into a blockchain framework. The blockchain framework, in turn, generates a set of anomaly data based on the set of event data. The information handling system identifies a set of parameter values to adjust corresponding to the IT ecosystem based on the set of anomaly data, and the information handling system then optimizes the IT ecosystem by adjusting the identified set of parameter values in the IT ecosystem.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

According to an aspect of the present invention there is a method, system and/or computer program product that performs the following operations (not necessarily in the following order): (i) loading a set of event data corresponding to an information technology (IT) ecosystem into a blockchain framework; (ii) generating, by the block chain framework, a set of anomaly data based on the set of event data; (iii) identifying a set of parameter values to adjust corresponding to the IT ecosystem based on the set of anomaly data; and (iv) optimizing the IT ecosystem by adjusting the identified set of parameter values in the IT ecosystem.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
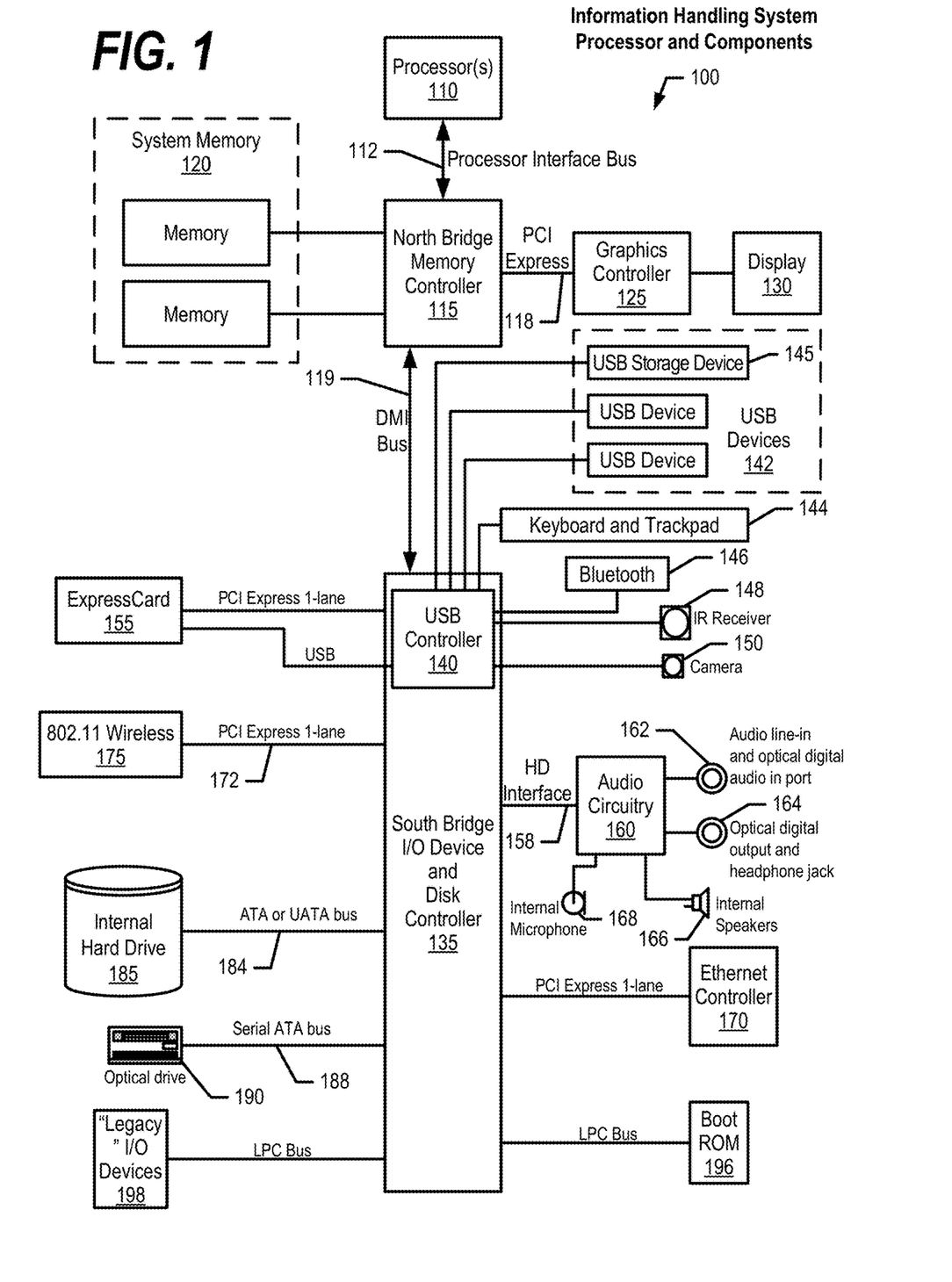
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
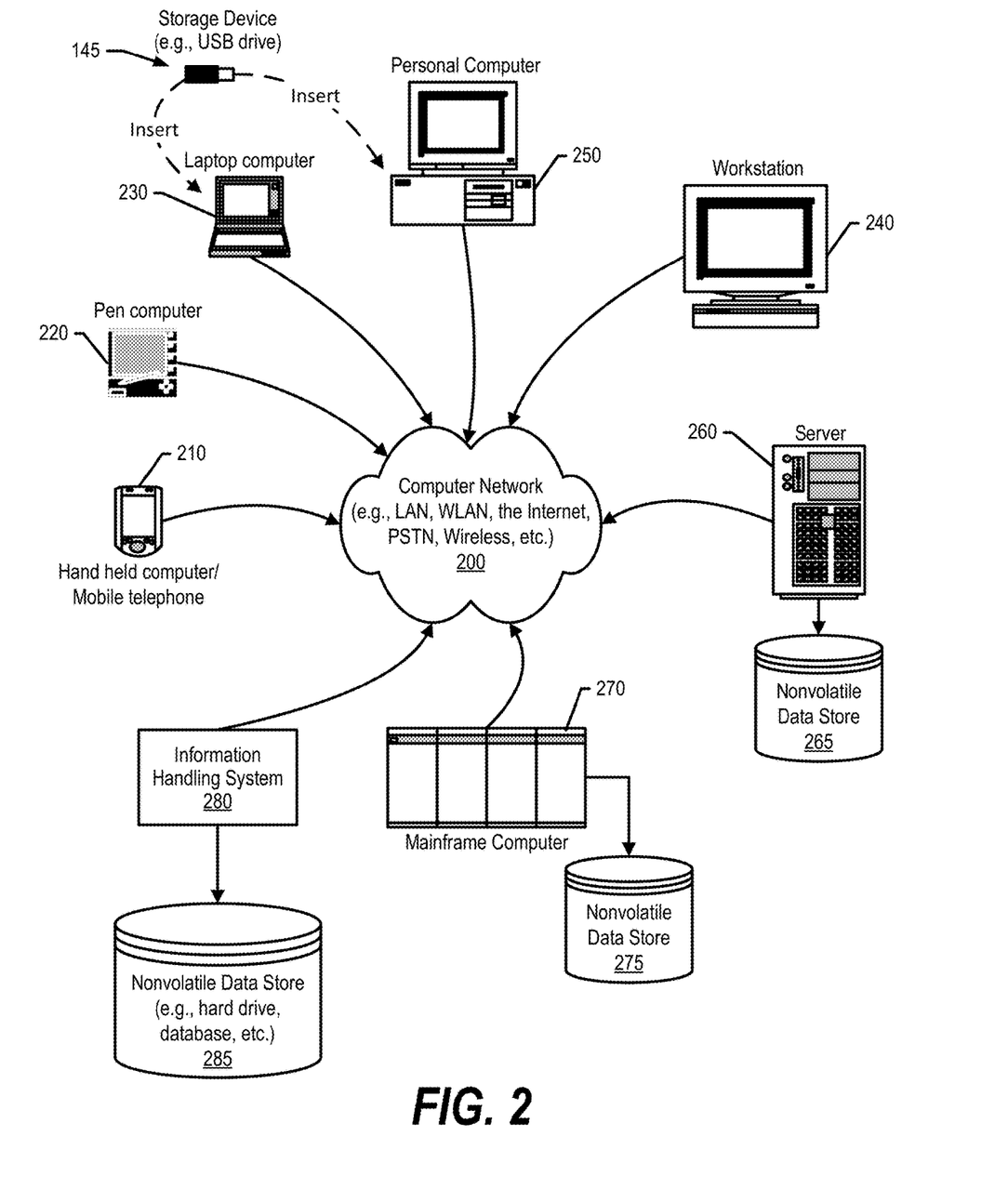
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, managing IT ecosystems presents many challenges because the IT ecosystems are largely managed by human endeavors supported by IT systems management processes, IT service management processes, spreadsheets, and staff/consultants. In addition, a lack of an overall orchestration or coordinated mechanism exists to identify root causes for systemic outages or performance issues within an IT ecosystem.

FIGS. 3 through 10 depict an approach that can be executed on an information handling system. The information handling system includes a cognitive IT ecosystem balancer that cognitively learns how to maintain an optimum balance of an IT ecosystem by continuously identifying key combinations of IT components and their applicable parameter levers that influence the optimization of the IT ecosystem's objectives, such as total cost of ownership, productivity, performance, throughput, capacity, integrity and security, resilience and vulnerability, etc. The information handling system uses a blockchain framework that tracks provenance, ownership, relationships & lineage of instrumented data, and generates anomaly data (true logs) that a cognitive balancer platform analyzes and adjusts parameter levers accordingly to maintain a balance within the IT ecosystem.

In one embodiment, the cognitive IT ecosystem balancer cognitively learns which levers are significant in achieving a desired IT ecosystem's goals and learns how to adjust the significant parameter levers to balance the constraints within the IT ecosystem. As defined herein, a parameter lever is an adjustable parameter adjusted by the cognitive IT ecosystem balancer such as a cost lever, a performance and duration lever, a capacity lever, a security and vulnerability lever, a resource skills/experience lever, a quality lever, a process maturity lever, a resilience lever, a service-level agreement (SLA) lever, a currency lever, an automation/savings lever, a deployment agility lever, a conformity to standards lever, and technology configuration and tuning levers. (see FIG. 6 and corresponding text for further details).

In another embodiment, the cognitive IT ecosystem balancer continuously learns to maintain a threshold of significant parameter levers and constraints by adding and removing parameter levers and constraints as they are discovered and/or removed. The cognitive IT ecosystem balancer learns which parameter lever changes impact other parameters. For example, when the cognitive IT ecosystem applies security patches to increase security, the performance of the IT ecosystem decreases and is noted by the cognitive IT ecosystem balancer.

In another embodiment, the cognitive IT ecosystem balancer manages malicious activity by detecting when the cognitive IT ecosystem's behavior is being impacted by malicious activity and automatically quarantines the source of the malicious activity to allow continued business processing. In this embodiment, the cognitive IT ecosystem balancer's learning is real time and identifies extremely sensitive changes in an IT ecosystem's behavior without predefined "security scanning images." For example, the cognitive IT ecosystem balancer uses a security image scanning mechanism and quarantines an image when the image is found to be deviation from standard images, has root access compromised, or lacks certain mandatory specifications. Other examples include potential denial of service activity that has not yet been picked up by dedicated DOS prevention appliances. The cognitive IT ecosystem balancer observes increasing resource constraints resulting in fine grained performance impacts within a component in the system. The rate of increase of the impacts may trigger learned balancing action including quarantining the source network paths including IP addresses and ports via appropriate network administration commands.

In another embodiment, the cognitive IT ecosystem balancer manages security compliance. In this embodiment, during real time monitoring of a security patching activity, the cognitive IT ecosystem balancer cognitively identifies security compliance violations against an IT ecosystem policy and applies the required corrective/isolation action accordingly.

In another embodiment, the cognitive IT ecosystem balancer autonomously detects out of bound anomalies, dynamically performs cost-benefit analysis of various actions taken by the cognitive IT balancer's workflow engine, and autonomously adapts to the least impacting action.

In another embodiment, the cognitive IT ecosystem balancer learns the basis of an IT ecosystem including multiple lever rules engines, design thresholds, policies, base-line considerations, lever configurations, design decisions, and result-sets from cost-benefit analysis. The cognitive IT ecosystem balancer accepts end user feedback on new pathways, thus allowing external factors into the cognitive process.

In another embodiment, the cognitive IT ecosystem balancer provides a path-breaking alternative to multiple performance engineering systems, monitoring systems, complex event processing systems, continuous compliance systems, and robotic automation with the additional capabilities for setting and watching the cognitive apparatus system tune the enterprise itself to achieve the desired business objectives.

In another embodiment, the cognitive IT ecosystem balancer replaces discrete tuning mechanisms and systems that operate on one part of an enterprise with a system that observes, learns and provides tuning parameter levers for the whole enterprise that has been included in the desired business objectives.

Figure 3:
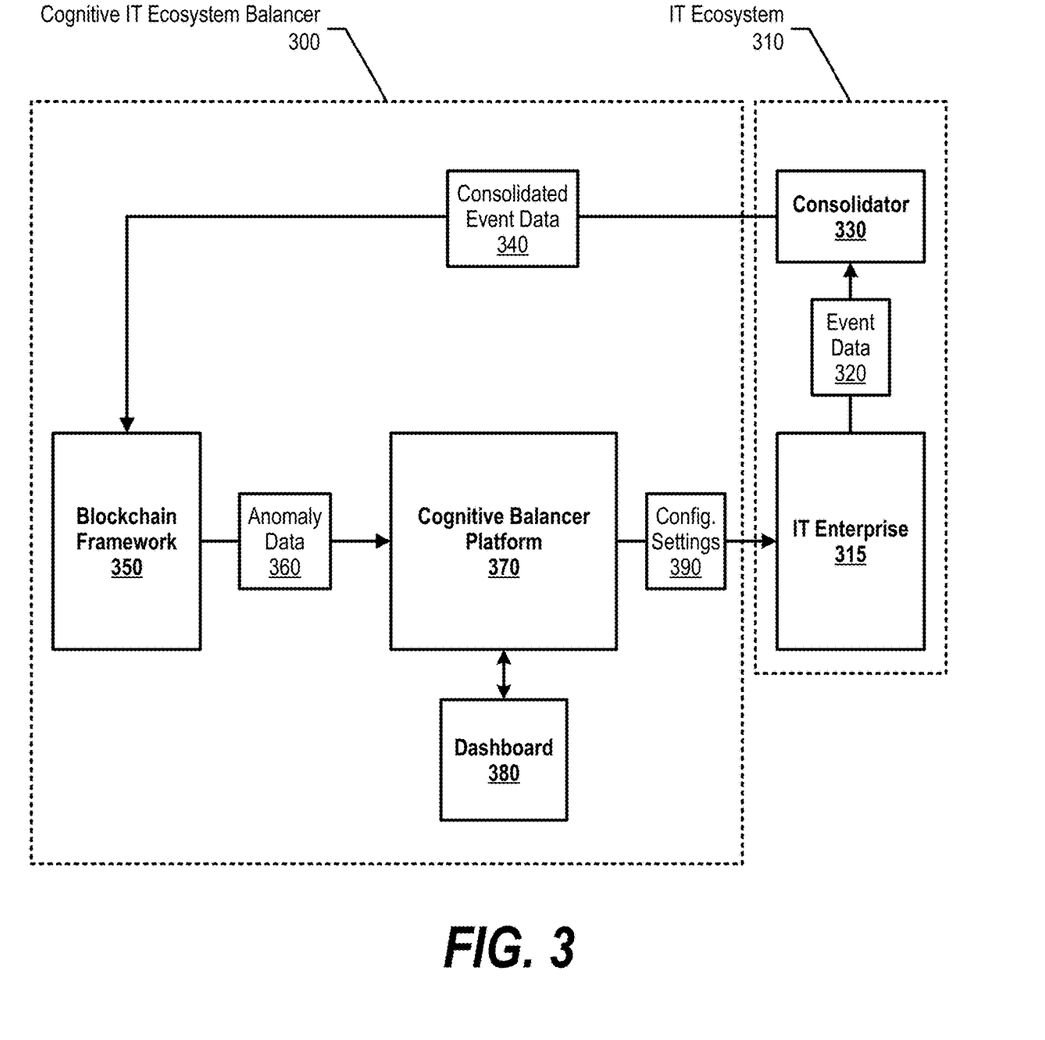
FIG. 3 is an exemplary diagram depicting a cognitive IT ecosystem balancer adjusting parameter levers as required to maintain a balance in an IT ecosystem.

FIG. 3 is an exemplary diagram depicting a cognitive IT ecosystem balancer adjusting parameter levers as required to maintain a balance in an IT ecosystem. As discussed above, cognitive IT ecosystem balancer 300 maintains a balance of IT ecosystem 310 by continuously identifying key combinations of IT components and their applicable parameters to adjust. In one embodiment, the IT components being adjusted include storage elements, network elements, compute elements, system elements, multiple data providers, discovery systems, data lakes, data warehouses, security databases, logger components, aggregator and consolidator component, event generator, IT operations analytic engine, and etcetera.

IT enterprise 315 generates event data 320 based on the states of the IT components in IT enterprise 315. Consolidator 330 collects event data 320 and consolidates (aggregates) the event data into consolidated event data 340, which includes security and performance logs.

Blockchain framework 350 loads consolidated event data 340 into "transaction shards" to utilize simplified correlation rules to detect out of bounds conditions. A shard is a horizontal portion of a database and each shard is stored in separate instances. Using shards spreads the load and allows blockchain framework 350 to be more efficient in analyzing the database.

Figure 9:
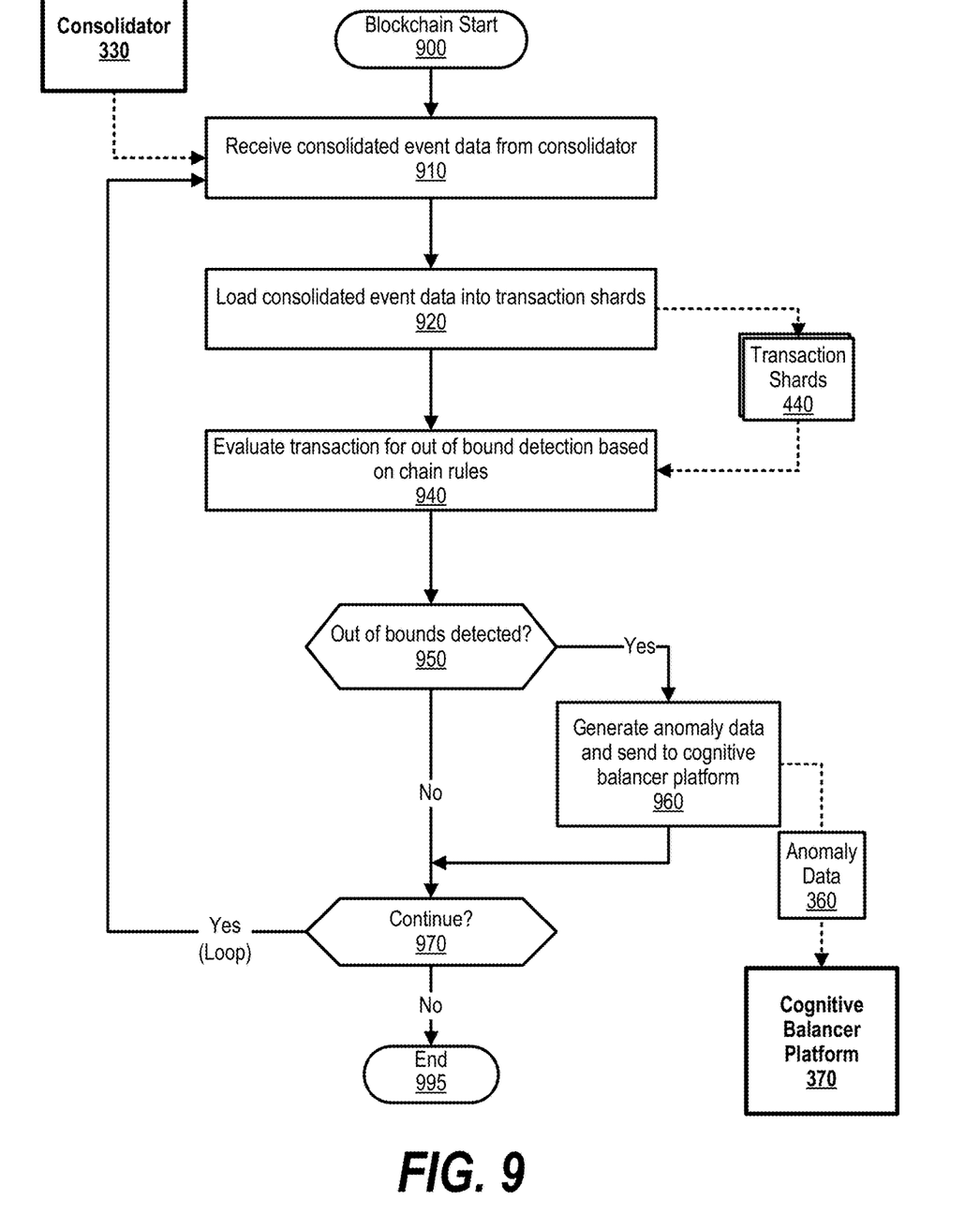
FIG. 9 is an exemplary flowchart showing steps taken by a blockchain platform to load event data into transaction shards and generate anomaly data based on the event data.

Blockchain framework 350 generates anomaly data 360 (true logs) when consolidated event data 340 creates out of bounds conditions according to chain rules (see FIG. 9 and corresponding text for further details). In one embodiment, anomaly data 360 provides the measurements and thresholds of each of the balancing lever components and provides transactional integrity. For example, anomaly data 360 for security patches would keep track of the various security patch update time-stamps of the servers, whereas anomaly data 360 for performance measures the equivalent performance breaches on a same set of servers.

Cognitive balancer platform 370 analyzes anomaly data 360 against policy rules and business rules, and identifies parameter levers to adjust to balance IT ecosystem 310. For example, if anomaly data 360 indicates a decrease in performance, cognitive balancer platform 370 decreases the security and vulnerability parameter lever if applicable to increase the performance (see FIGS. 5, 6, 10, and corresponding text for further details). In one embodiment, cognitive balancer platform 370 displays proposed lever adjustment recommendations to an administrator via dashboard 380 for feedback (see FIG. 7 and corresponding text for further details). The administrator provides administrator changes as needed, and cognitive balancer platform 370 learns from the administrator's modifications and balances IT ecosystem 310 via configuration settings 390 accordingly (see FIGS. 3, 10, and corresponding text for further details).

Figure 4:
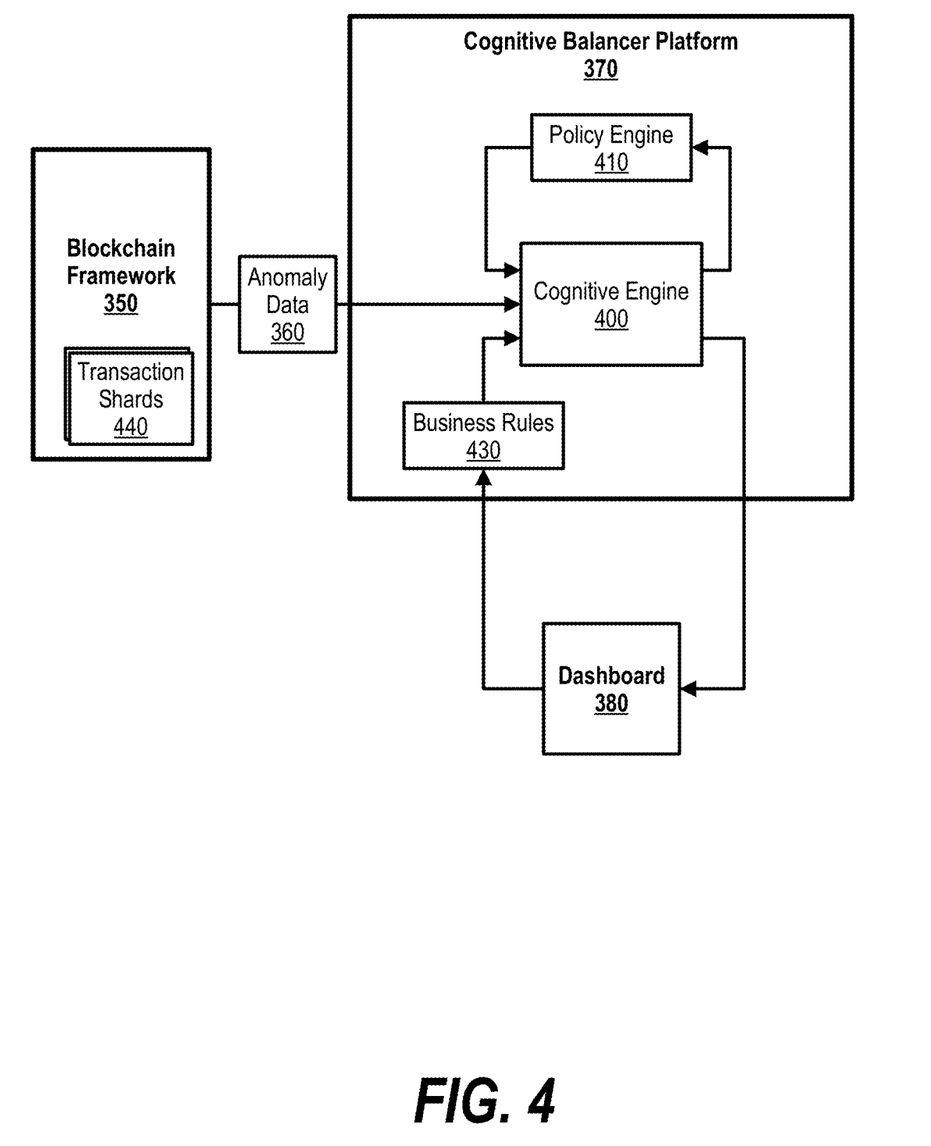
FIG. 4 is an exemplary diagram depicting a blockchain framework that provides anomaly data corresponding to behavior of an IT ecosystem to a cognitive balancer platform for analysis.

FIG. 4 is an exemplary diagram depicting a blockchain framework that provides anomaly data corresponding to behavior of an IT ecosystem to a cognitive balancer platform for analysis. As discussed earlier, blockchain framework 350 loads consolidated event data 340 into transaction shards 440, each storing horizontal portions of consolidated event data 340. Blockchain framework 350 provides the integrity, authenticity and validation of the transactions, component measures, and instrumentation data.

Blockchain framework 350 also enables the tracking of provenance, ownership, relationships & lineage of instrumented data, while also settling conflicting disputes. In one embodiment blockchain framework 350, in conjunction with cognitive balancer platform 370, undertakes key decisions in case of multiple conflicting criteria of multiple parameter levers such as cost-resilience-quality levers. For example, recommendations are identified to increase cost considerations or cost of transactions when cognitive balancer platform 370 detects disputes that the resilience of the system is intact but the quality of the component build is compromised. In this example, cognitive balancer platform 370 provides a dispute resolution via dashboard 380 by providing a recommendation of ideal parameter lever adjustments to be compromised versus which parameter levers to adjust.

Cognitive balancer platform 370 includes cognitive engine 400, which continuously learns from interactions and feedback of IT ecosystem 310 and dashboard 380. Cognitive engine 400 generates recommendations for design thresholds, policies, base-line considerations, lever configurations, design decisions, cost-benefit analysis, etc. based on anomaly data 360. In one embodiment, cognitive engine 400 is initially boot-strapped with human knowledge of various security and tuning configurations and then commences run-time learning and adaptation.

Policy engine 410 and business rules 430 include IT ecosystem 310's policies and rules, including those related to business, design, tuning, security and compliance considerations. Policy engine 410 also includes information pertaining to an outlier detection algorithm and design thresholds. In one embodiment, the outlier detection algorithm detects any out-of-bounds conditions for designated thresholds of the parameter levers. In this embodiment, blockchain framework 350 detects any out of bounds conditions (anomalies), sends anomaly data 360 (true logs) to cognitive balancer platform 370, and cognitive balancer platform 370 uses the outlier algorithm to determine whether the anomaly data exceeds any of the designated thresholds for the parameter levers. In this embodiment, the thresholds for each of the parameter levers are specified in policy engine 410 and are dynamically adjustable based on trend analysis of the various parameter lever values for a given specified duration.

Business rules 430 include information pertaining to business contextual information such as system revenue, support models, and contractual details. Cognitive balancer platform 370 uses policy engine 410 and business rules 430 to detect various anomalies in the IT ecosystem 310 with respect to configured parameters versus baseline parameters.

In one embodiment, anomaly detection is based on various trend measurements of the various lever parameters and flagging of various outlier based conditions. In this embodiment, cognitive balancer platform 370 produces anomaly detection flags across multiple competitive parameter levers. Some examples of out of bound criteria are 1) deviation is greater than three standard deviations on a twenty week average; 2) two out of three deviations are on the same side of the average line and more than two standard deviations from it on a twenty week average; 3) four out of five deviations are on the same side of the average line and more than one standard deviations from it on a twenty week average.

Cognitive balancer platform 370 interfaces to visual dashboard 380 to provide parameter lever adjustment recommendations to an administrator. Dashboard 380 displays various parameter lever adjustment recommendations, design considerations, and recent transactions taken by cognitive balancer platform 370 to harmonize and balance IT ecosystem 310 (see FIG. 7 and corresponding text for further details).

Figure 5:
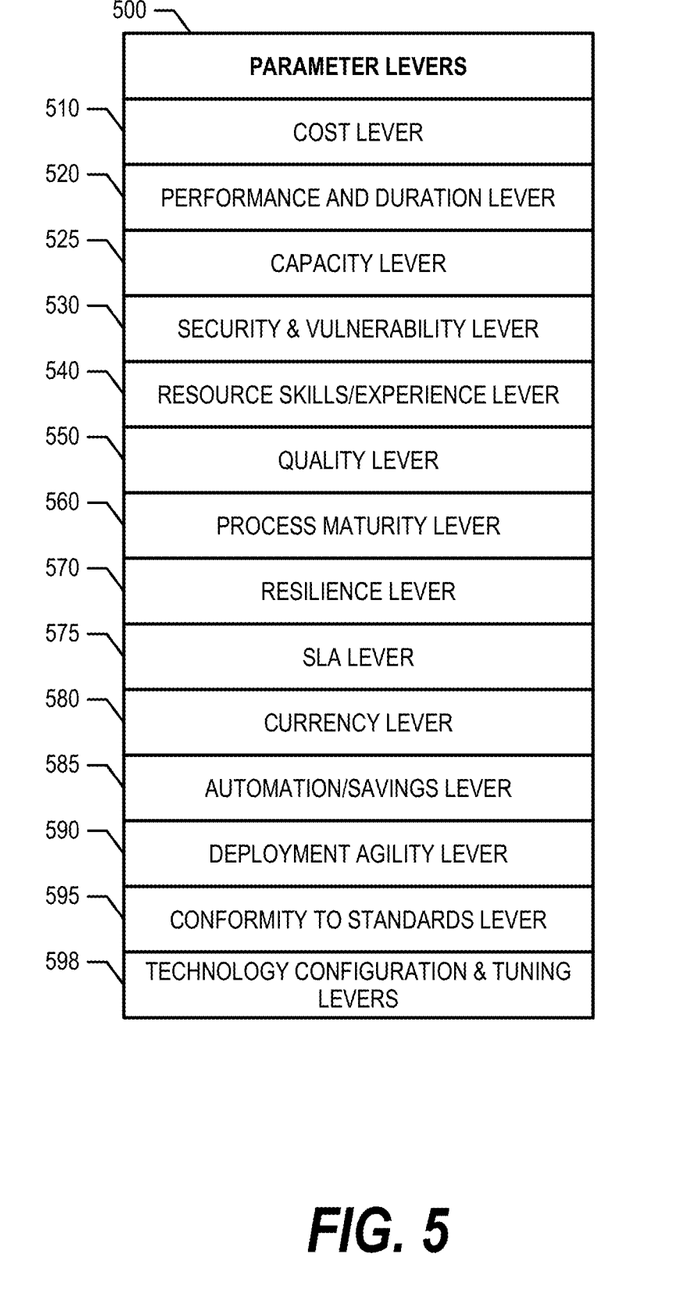
FIG. 5 is an exemplary diagram depicting a list of parameter levers that are adjusted by a cognitive balancer platform to maintain a balance in an IT ecosystem.
Figure 6:
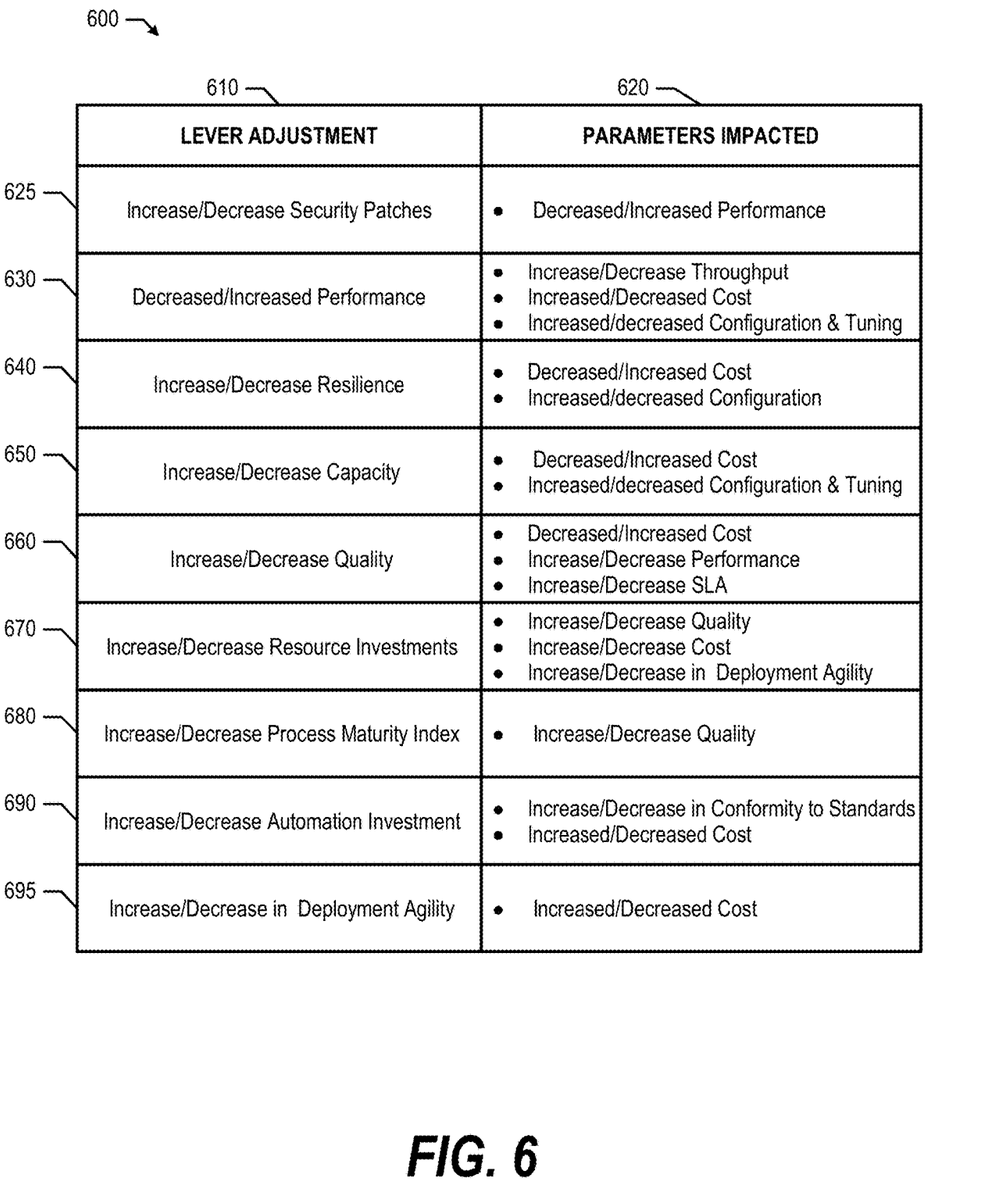
FIG. 6 is an exemplary diagram depicting a relationship between levers adjusted versus parameters impacted.

FIG. 5 is an exemplary diagram depicting a list of parameter levers that are adjusted by cognitive balancer platform 370 to maintain a balance in IT ecosystem 310. Parameter levers 500 includes a list of parameter levers that cognitive balancer platform 370 adjusts based on anomaly data 360. Each parameter lever corresponds to a threshold and, as shown in FIG. 6, adjusting one of the parameter levers typically affects a different parameter.

Cost lever 510 corresponds to the operating cost of IT ecosystem 310, such as license of servers, operating personnel costs, maintenance costs, etc. Performance and duration lever 520 corresponds to the performance/duration of IT ecosystem 310 such as network performance, storage performance, server performance, etc. Capacity lever 525 corresponds to the capacity of IT ecosystem 310 such as its storage capacity.

Security and vulnerability lever 530 corresponds to how much security to apply to IT ecosystem 310, such as intrusion detection, vulnerability management, penetration testing, anti-virus detection, security patching, etc. Resource skills/experience lever 540 corresponds to enablement times for building skills, lead time for enablement skills approval, resource staffing, lead time index, etc. Quality lever 550 corresponds to the quality of service of IT ecosystem 310, such as service agreement levels, IT availability & business continuity parameters, etc.

Process maturity lever 560 corresponds to operational processes as incident, problem, change management, asset management, SLA management, etc. Resilience lever 570 corresponds to middleware resilience, server resilience, network resilience, database resilience, etc. SLA lever 575 corresponds to service level agreements maintained by IT ecosystem 310.

Currency lever 580 corresponds to server currency, storage currency, application currency, etc. Automation/savings lever 585 corresponds to savings derived from, for example, runbook automation, provisioning automation, cloud enabled automation, incidents savings due to automation of monitoring, etc. Deployment agility lever 590 corresponds to deployment of new business, new technical components, new architectures, greenfield deployments, cloud migration, etc.

Conformity to standards lever 595 corresponds to conformity to maintain various environment specifications, deployment standards, component specifications, adherence to enterprise frameworks, architectural decision alignments, etc. And, technology configuration and tuning levers 598 represents the collection of identified and learned configuration and/or tuning levers associated with the technologies involved in IT ecosystem 310 in the scope of cognitive IT ecosystem balancer 300.

FIG. 6 is an exemplary diagram depicting a relationship between adjusting parameter levers versus other parameters impacted. In one embodiment, cognitive IT ecosystem balancer 300 cognitively learns which other parameters are impacted from adjusting a particular parameter. For example, cognitive IT ecosystem balancer 300 may adjust smart eyewear system 300 may increase a performance parameter lever.

Table 600 includes column 610 and column 620. Column 610 includes various lever adjustments and column 620 includes parameters impacted other than the parameter corresponding to the adjusted lever. Row 625 shows that by increasing/decreasing security patches, performance is inversely impacted. Row 630 shows that decreasing/increasing performance increases/decreases throughput, cost, and configuration and tuning. Row 640 shows that increasing/decreasing resilience has an inverse effect on cost and increases/decreases configuration and tuning. Row 650 shows that increasing/decreasing capacity also has an inverse effect on cost and increases/decreases configuration and tuning. Row 660 shows that increasing/decreasing quality decreases/increases costs, increases/decreases performance, and increases/decreases SLA.

Row 670 shows that increasing/decreasing resource investments increases/decreases quality, cost, and deployment agility. Row 680 shows that increasing/decreasing process maturity index increases/decreases quality. Row 690 shows that increasing/decreasing automation investment increases/decreases cost and conformity to standards. And, row 695 shows that increasing/decreasing deployment agility increases/decreases cost.

Figure 7:
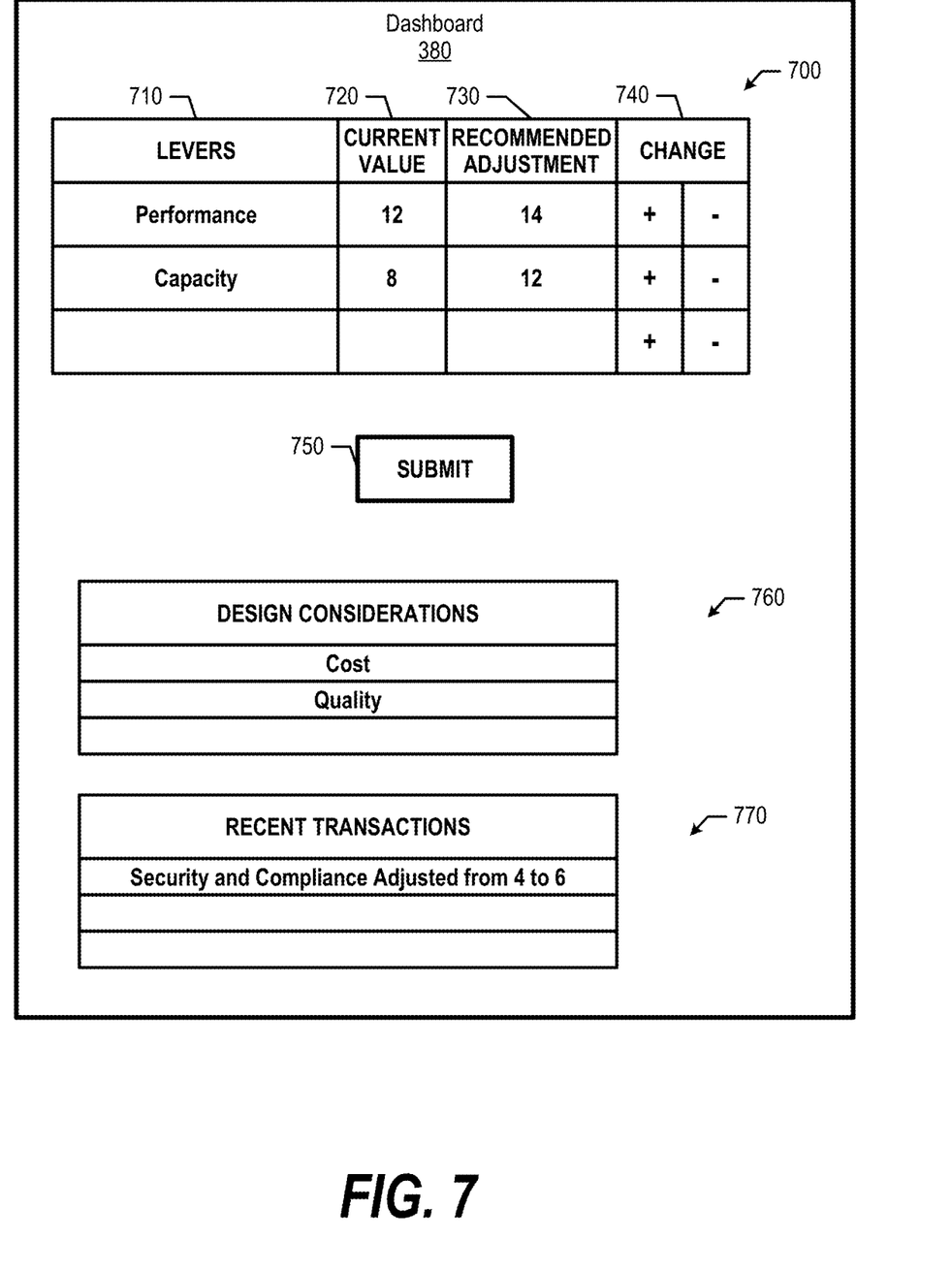
FIG. 7 is an exemplary diagram of a visual dashboard that displays configuration information to an administrator.

FIG. 7 is an exemplary diagram of a visual dashboard that displays configuration information to an administrator. Matrix 700 displays parameter levers and adjustments recommended by cognitive balancer platform 370. Column 710 includes the name of the parameter lever and column 720 includes the current value of the corresponding parameter lever. Column 730 includes a recommended adjustment value and column 740 allows the administrator to change the recommended adjustment value. When the administrator is finished changing the recommended adjustments, the administrator selects submit button 750.

Table 760 includes design considerations of cognitive IT ecosystem balancer 300. In one embodiment, the administrator selects one of the design considerations and dashboard 380 displays details behind the selected design consideration.

Table 770 shows recent transactions of cognitive IT ecosystem balancer 300, such as increasing/decreasing various parameter lever values. In one embodiment, dashboard 380 displays more, less, or different information than what is shown in FIG. 7.

Figure 8:
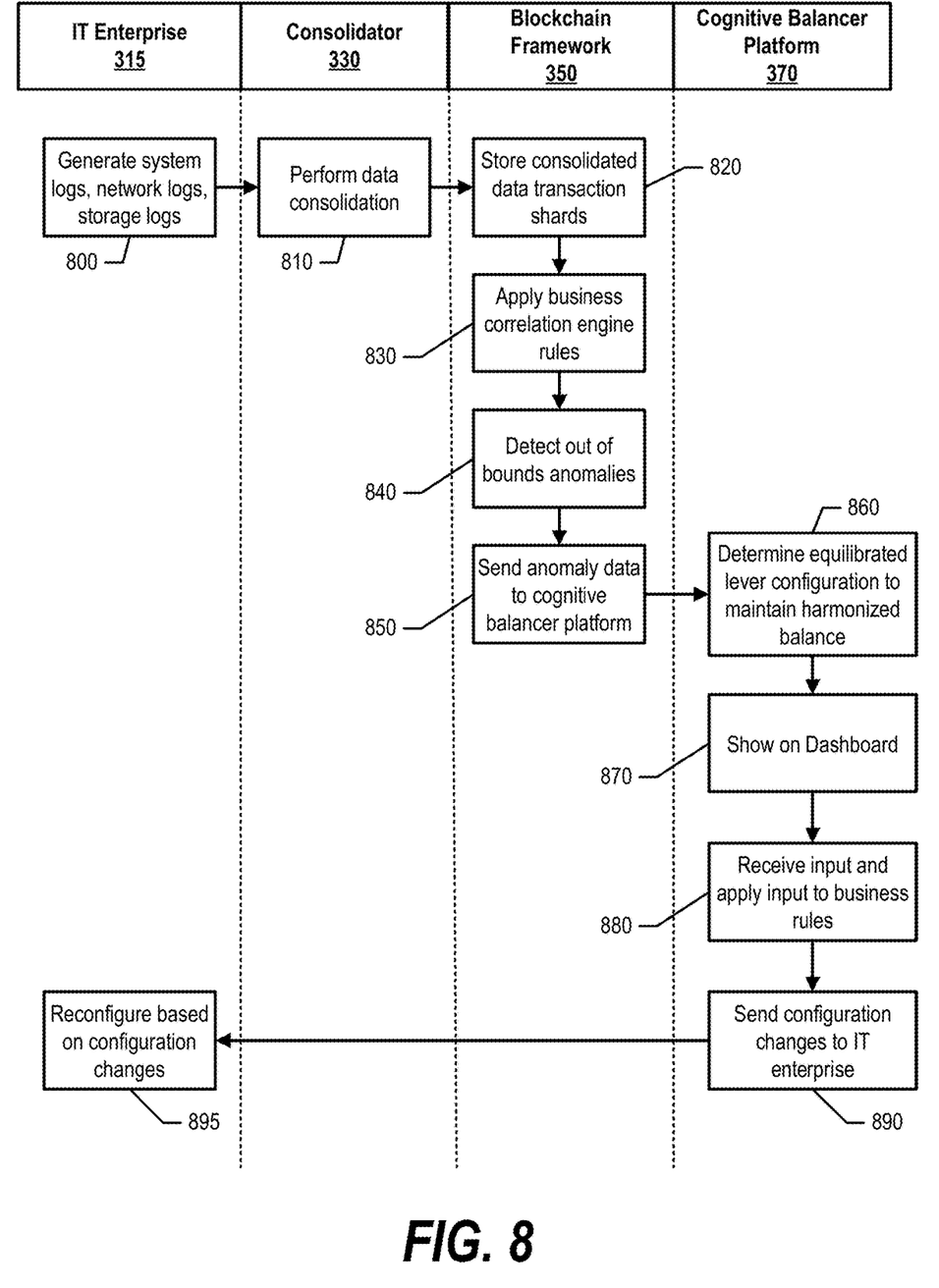
FIG. 8 is an exemplary diagram showing interaction between an IT ecosystem and various components in a cognitive IT ecosystem balancer.

FIG. 8 is an exemplary diagram showing interaction between an IT ecosystem and various components in cognitive IT ecosystem balancer 300. During operation, IT enterprise 310 generates system logs, network logs, storage logs, etc. (800), which feed into consolidator 330. Consolidator 330 aggregates and consolidates the logs (810) and feeds consolidated event data 340 into blockchain framework 350.

Blockchain framework 350 stores (loads) the consolidated data into transaction shards (820). In one embodiment, the consolidated data is separated into domain type data sets associated with source logs that represent the source component type within IT Ecosystem 310. Each transaction shard is configured to be sensitive to a domain type. Blockchain framework 350 then applies business correlation engine rules to the transaction shards (830) and detects whether out of bounds anomalies are present (840, such as breaches of various performance and capacity thresholds, investment targets breaches, achievements of automation savings targets, etc. When out of bounds conditions exist, blockchain framework 350 generates anomaly data 360 that feeds into cognitive balancer platform 370 (850). In one embodiment, the blockchain correlation rules are initially similar to business runes 430 and, over time, standard correlation analysis are applied to the domain data to determine course grain correlations. These would then be fed in the cognitive engine to learn how to balance the system based on the policies and business rules provided. The outcome provides feedback to the block change framework in terms of "chain rules" on the significant correlations relative to the balance. The blockchain framework then searches for correlation anomalies as it processes incoming logs. These represent a shift from correlations that enable the desired balance and thus may require lever adjustment to bring the observed log data back into line.

Cognitive balancer platform 370 analyzes the anomaly data and determines lever adjustment recommendations required to equilibrate IT ecosystem 310 (860). For example, a breached investment target threshold may require equilibration of an equivalent lever of quality of service or resource investment costs, whereas an increased vulnerability score may need to be equilibrated with an additional costs lever to support additional security patching of servers.

Cognitive balancer platform 370 displays the lever adjustment recommendations on dashboard 380 (870) and receives administrator changes from an administrator that accepts or changes the proposed adjustments (880). Cognitive balancer platform 370 applies the administrator changes to the business rules, allowing cognitive balancer platform 370 to learn from the administrator changes. In turn, cognitive balancer platform 370 sends configuration changes corresponding to the parameter lever adjustments to IT enterprise 315 (890). IT enterprise 315 receives the changes and reconfigures its various IT components accordingly (895).

FIG. 9 is an exemplary flowchart showing steps taken by a blockchain platform to load event data into transaction shards and generate anomaly data based on the event data. FIG. 9 processing commences at 900 whereupon, at step 910, the process receives consolidated event data from consolidator 330. At step 920, the process loads the consolidated event data into transaction shards as discussed above.

At step 940, the process evaluates the transaction shards for out of bounds anomalies based on chain rules as discussed above. The process determines as to whether an out of bounds condition is detected (decision 950). If an out of bounds condition is detected, then decision 950 branches to the 'yes' branch whereupon, at step 960, the process generates anomaly data (true logs) and sends the anomaly data to cognitive balancer platform 370 (see FIG. 10 and corresponding text for further details).

On the other hand, if an out of bounds condition is not detected, indicating that IT ecosystem 310 is optimized, then decision 950 branches to the 'no' branch bypassing step 960.

The process determines as to whether to continue (decision 970). If the process should continue, then decision 970 branches to the 'yes' branch which loops back to receive and process more consolidated event data. This looping continues until the process should terminate, at which point decision 970 branches to the 'no' branch exiting the loop. FIG. 9 processing thereafter ends at 995.

Figure 10:
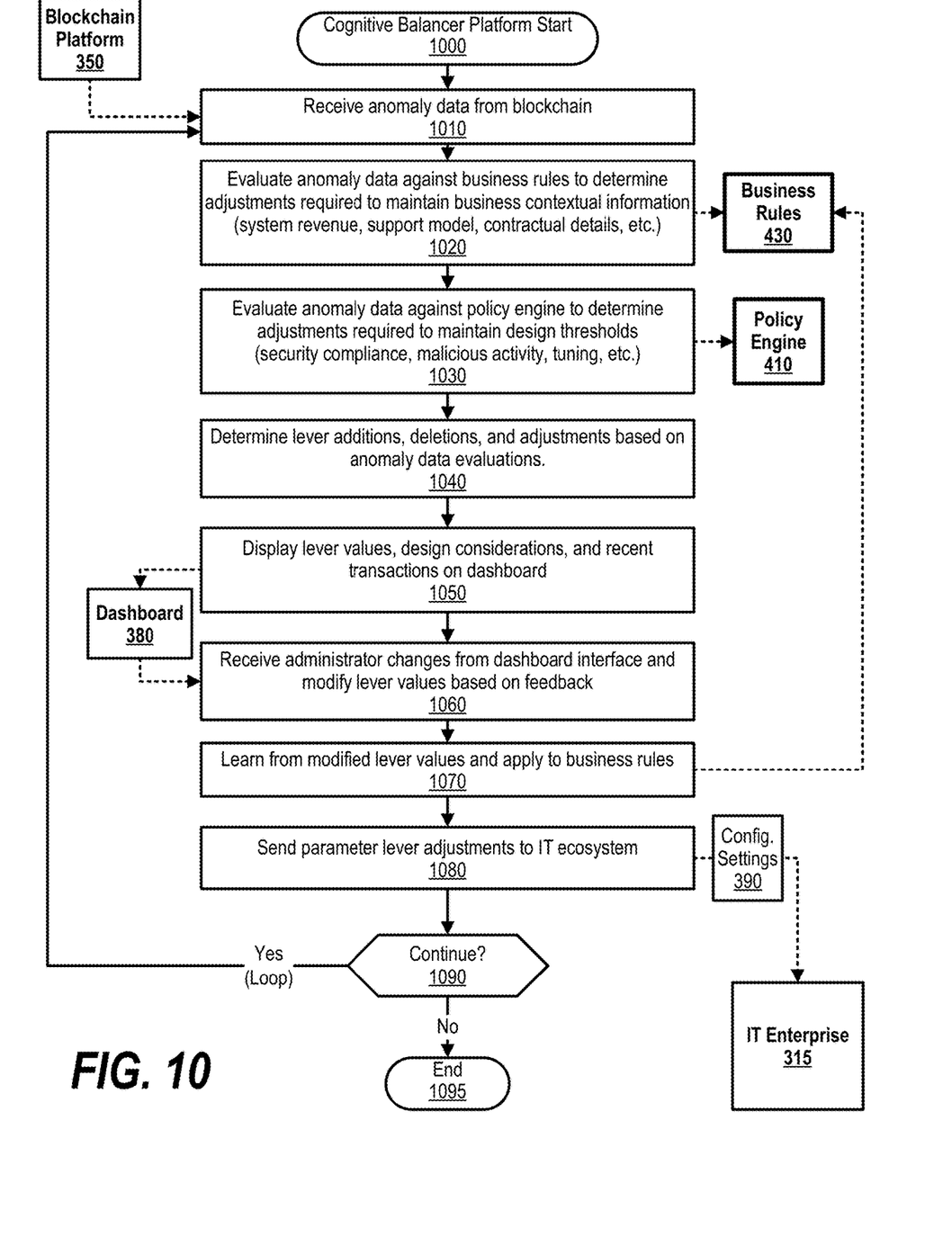
FIG. 10 is an exemplary flowchart showing steps taken by a cognitive balancer platform to balance an IT ecosystem.

FIG. 10 is an exemplary flowchart showing steps taken by a cognitive balancer platform to balance an IT ecosystem. FIG. 10 processing commences at 1000 whereupon, at step 1010, the process receives anomaly data from blockchain framework 350. At step 1020, the process evaluates the anomaly data against business rules to determine adjustment recommendations required to maintain business contextual information (system revenue, support model, contractual details, etc.).

At step 1030, the process evaluates the anomaly data against design thresholds using the policy engine to determine adjustment recommendations required to maintain the design thresholds (security compliance, malicious activity, tuning, etc.). In one embodiment, as discussed earlier, policy engine 410 uses an outlier detection algorithm to analyze the anomaly data against parameter lever thresholds to determine whether the anomaly data exceeds any of the designated thresholds for the parameter levers.

At step 1040, the process determines lever additions, deletions, and adjustment recommendations based on the anomaly data evaluations from steps 1020 and 1030. In one embodiment, a new lever is incorporated for a specific enterprise, such as a new personnel safety lever based on a new criteria of hazardous work conditions of a new chemical plant. As another example, a new lever is introduced to measure business leadership via various response times for hiring, cost-overrun approvals, profit measurements, etc.

At step 1050, the process displays the parameter lever adjustment recommendations, design considerations, and recent transactions on dashboard 380 for an administrator to view and change. At step 1060, the process receives administrator changes from the administrator via dashboard 380 and modifies the parameter lever values based on the feedback. For example, the administrator wishes to increase performance by means other than decreasing security.

At step 1070, the process learns from the modified parameter lever values by adjusting business rules 430 accordingly. For example, a profitability lever can be fine-tuned based on multiple project cost-overruns, delays of business decisions and approvals, detection of reduced go-to-market avenues of the channel products, etc.

At step 1080, the process sends the parameter lever adjustments via configuration settings 390 to IT enterprise 315. IT enterprise 315, in turn, reconfigures various IT components accordingly based on configuration settings 390.

The process determines as to whether to continue (decision 1090). If the process should continue, then decision 1090 branches to the 'yes' branch which loops back to receive more anomaly data from blockchain platform 350 and process the anomaly data. This looping continues until the process should terminate, at which point decision 1090 branches to the 'no' branch exiting the loop. FIG. 10 processing thereafter ends at 1095.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
loading a set of event data corresponding to an information technology (IT) ecosystem into a blockchain framework, wherein the set of event data identifies a set of states of a set of IT components in the IT ecosystem;
separating the set of event data into a plurality of domain type data sets based on their corresponding IT component in the set of IT components;
storing each of the plurality of domain type data sets into one of a plurality of transaction shards;
analyzing the plurality of transaction shards against a set of correlation rules, wherein the set of correlation rules corresponds to a set of correlations between a set of parameters that optimize the IT ecosystem;
in response to the analyzing, generating a set of anomaly data that identifies one or more out of bounds conditions based on the set of correlation rules; and
adjusting a set of parameter values corresponding to the set of parameters based on the one or more out of bounds conditions, wherein the adjusted set of parameter values reconfigures at least one of the set of IT components and optimizes the IT ecosystem.

2. The method of claim 1 further comprising:
determining that the set of anomaly data exceeds a portion of a plurality of design thresholds corresponding to a plurality of parameter levers; and
selecting a portion of the plurality of parameter levers corresponding to the exceeded portion of the plurality of design thresholds, wherein the set of parameter values to adjust corresponds to the selected portion of the plurality of parameter levers.

3. The method of claim 1 further comprising:
evaluating the set of anomaly data against a set of business rules;
in response to evaluating the set anomaly data against the set of business rules, detecting an anomaly of at least one of a system revenue, a support model, and a contractual agreement; and
identifying the set of parameter values to adjust based on the detected anomaly.

4. The method of claim 1 further comprising:
displaying the set of parameter values to adjust on a user interface as a set of adjustment recommendations;
receiving one or more administrator changes to the set of adjustment recommendations; and
adjusting a cognitive engine in the information handling system based on the one or more administrator changes.

5. The method of claim 1 further comprising:
quarantining an image in response to determining that the set of anomaly data indicates a malicious activity by the image within the IT ecosystem.

6. The method of claim 1 wherein set of event data corresponds to at least one of the set of IT components included in the IT ecosystem selected from the group consisting of an IT enterprise storage element, an IT enterprise network element, an IT enterprise compute element, an IT enterprise system element, an IT enterprise discovery system component, an IT enterprise data lakes component, an IT enterprise data warehouse component, an IT enterprise security database component, an IT enterprise logger component, an IT enterprise aggregator component, an IT enterprise consolidator component, an IT enterprise event generator component, and an IT operations analytic engine component.

7. The method of claim 1 wherein at least one of the set of parameter values corresponds to at least one parameter lever selected from the group consisting of a cost lever, a performance and duration lever, a capacity lever, a security and vulnerability lever, a resource skills/experience lever, a quality lever, a process maturity lever, a resilience lever, a service-level agreement (SLA) lever, a currency lever, an automation/savings lever, a deployment agility lever, a conformity to standards lever, and a technology configuration and tuning lever.

8. An information handling system comprising:
one or more processors;
a memory coupled to at least one of the processors;
a set of computer program instructions stored in the memory and executed by at least one of the processors in order to perform actions of:
loading a set of event data corresponding to an information technology (IT) ecosystem into a blockchain framework, wherein the set of event data identifies a set of states of a set of IT components in the IT ecosystem;
separating the set of event data into a plurality of domain type data sets based on their corresponding IT component in the set of IT components;
storing each of the plurality of domain type data sets into one of a plurality of transaction shards;
analyzing the plurality of transaction shards against a set of correlation rules, wherein the set of correlation rules corresponds to a set of correlations between a set of parameters that optimize the IT ecosystem;
in response to the analyzing, generating a set of anomaly data that identifies one or more out of bounds conditions based on the set of correlation rules; and
adjusting a set of parameter values corresponding to the set of parameters based on the one or more out of bounds conditions, wherein the adjusted set of parameter values reconfigures at least one of the set of IT components and optimizes the IT ecosystem.

9. The information handling system of claim 8 wherein the processors perform additional actions comprising:
determining that the set of anomaly data exceeds a portion of a plurality of design thresholds corresponding to a plurality of parameter levers; and
selecting a portion of the plurality of parameter levers corresponding to the exceeded portion of the plurality of design thresholds, wherein the set of parameter values to adjust corresponds to the selected portion of the plurality of parameter levers.

10. The information handling system of claim 8 wherein the processors perform additional actions comprising:
evaluating the set of anomaly data against a set of business rules;
in response to evaluating the set anomaly data against the set of business rules, detecting an anomaly of at least one of a system revenue, a support model, and a contractual agreement; and
identifying the set of parameter values to adjust based on the detected anomaly.

11. The information handling system of claim 8 wherein the processors perform additional actions comprising:
displaying the set of parameter values to adjust on a user interface as a set of adjustment recommendations;
receiving one or more administrator changes to the set of adjustment recommendations; and
adjusting a cognitive engine in the information handling system based on the one or more administrator changes.

12. The information handling system of claim 8 wherein the processors perform additional actions comprising:
quarantining an image in response to determining that the set of anomaly data indicates a malicious activity by the image within the IT ecosystem.

13. A computer program product stored in a computer readable storage medium, comprising computer program code that, when executed by an information handling system, causes the information handling system to perform actions comprising:
loading a set of event data corresponding to an information technology (IT) ecosystem into a blockchain framework, wherein the set of event data identifies a set of states of a set of IT components in the IT ecosystem;
separating the set of event data into a plurality of domain type data sets based on their corresponding IT component in the set of IT components;
storing each of the plurality of domain type data sets into one of a plurality of transaction shards; and analyzing the plurality of transaction shards against a set of correlation rules, wherein the set of correlation rules corresponds to a set of correlations between a set of parameters that optimize the IT ecosystem;

in response to the analyzing, generating a set of anomaly data that identifies one or more out of bounds conditions based on the set of correlation rules;

adjusting a set of parameter values corresponding to the set of parameters based on the one or more out of bounds conditions, wherein the adjusted set of parameter values reconfigures at least one of the set of IT components and optimizes the IT ecosystem.

14. The computer program product of claim 13 wherein the information handling system performs further actions comprising:

determining that the set of anomaly data exceeds a portion of a plurality of design thresholds corresponding to a plurality of parameter levers; and selecting a portion of the plurality of parameter levers corresponding to the exceeded portion of the plurality of design thresholds, wherein the set of parameter values to adjust corresponds to the selected portion of the plurality of parameter levers.

15. The computer program product of claim 13 wherein the information handling system performs further actions comprising:

evaluating the set of anomaly data against a set of business rules;

in response to evaluating the set anomaly data against the set of business rules, detecting an anomaly of at least one of a system revenue, a support model, and a contractual agreement; and identifying the set of parameter values to adjust based on the detected anomaly.

16. The computer program product of claim 13 wherein the information handling system performs further actions comprising:

displaying the set of parameter values to adjust on a user interface as a set of adjustment recommendations;

receiving one or more administrator changes to the set of adjustment recommendations; and adjusting a cognitive engine in the information handling system based on the one or more administrator changes.

17. The computer program product of claim 13 wherein the information handling system performs further actions comprising:

quarantining an image in response to determining that the set of anomaly data indicates a malicious activity by the image within the IT ecosystem.

* * * * *